(12) United States Patent
Austefjord et al.

(10) Patent No.: US 9,303,473 B2
(45) Date of Patent: Apr. 5, 2016

(54) VIDEOMETRIC SYSTEMS AND METHODS FOR OFFSHORE AND OIL-WELL DRILLING

(75) Inventors: Arne Austefjord, Sandnes (NO); Pal Jacob Nessjoen, Trondheim (NO)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 593 days.

(21) Appl. No.: 13/695,208

(22) PCT Filed: Apr. 28, 2011

(86) PCT No.: PCT/GB2011/000665
§ 371 (c)(1),
(2), (4) Date: Jan. 13, 2013

(87) PCT Pub. No.: WO2011/135310
PCT Pub. Date: Nov. 3, 2011

(65) Prior Publication Data
US 2013/0120577 A1    May 16, 2013

(30) Foreign Application Priority Data
Apr. 29, 2010  (GB) .................................. 1007200.7

(51) Int. Cl.
*G06K 9/00*        (2006.01)
*E21B 19/16*       (2006.01)
*B66C 13/02*       (2006.01)
(Continued)

(52) U.S. Cl.
CPC ............... *E21B 19/165* (2013.01); *B66C 13/02* (2013.01); *B66C 13/085* (2013.01); *B66C 23/16* (2013.01); *H04N 7/18* (2013.01)

(58) Field of Classification Search
CPC ...................................................... H04N 7/18
See application file for complete search history.

(56) References Cited

U.S. PATENT DOCUMENTS 3,804,268 A * 4/1974 Barron et al. ............... 414/139.5
3,881,608 A * 5/1975 Hupkes ....................... 414/141.3
(Continued)

FOREIGN PATENT DOCUMENTS

| EP | 1939131 A2 | 7/2008 |
|---|---|---|
| GB | 2267360 A | 12/1993 |
| WO | 2011135310 A2 | 11/2011 |

OTHER PUBLICATIONS

International Application No. PCT/GB2011/000665 Search Report and Written Opinion dated Jul. 6, 2012.

*Primary Examiner* — Stephen R Koziol
*Assistant Examiner* — Sean Conner
(74) *Attorney, Agent, or Firm* — Conley Rose, P.C.

(57) ABSTRACT

A crane control system for determining a suitable real-time operating regime for a crane arranged to lift cargo from a marine vessel, the system includes an imaging means associated with the crane, a processing means, and a memory means. The imaging means is arranged to capture images of the vessel when it is located generally below the crane and within the operational range of the crane. The processing means is operable to calculate from the captured images movement parameters characterizing the movement of the vessel relative to the crane. The memory contains performance data representative of the performance characteristics of the crane and cargo data representative of the weight of individual items of said cargo. The processing means is further configured to compare the calculated movement parameters to the performance data and the cargo data and to determine from said comparison a safe operating regime for the crane.

19 Claims, 7 Drawing Sheets

(51) Int. Cl.
*B66C 13/08* (2006.01)
*B66C 23/16* (2006.01)
*H04N 7/18* (2006.01)

(56) References Cited

U.S. PATENT DOCUMENTS

| | | | | |
|---|---|---|---|---|
| 4,544,137 | A * | 10/1985 | Johnson | 254/337 |
| 4,547,857 | A * | 10/1985 | Alexander | 700/275 |
| 5,089,972 | A | 2/1992 | Nachman et al. | 700/218 |
| 5,142,658 | A * | 8/1992 | McMorran et al. | 382/104 |
| 5,780,826 | A * | 7/1998 | Hareyama et al. | 235/385 |
| 6,256,553 | B1 | 7/2001 | Erikkila | 700/213 |
| 6,332,098 | B2 * | 12/2001 | Ross et al. | 700/226 |
| 6,648,571 | B1 * | 11/2003 | Franzen et al. | 414/141.4 |
| 6,694,215 | B1 * | 2/2004 | Kwon et al. | 700/213 |
| 6,826,452 | B1 * | 11/2004 | Holland et al. | 700/245 |
| 7,508,956 | B2 * | 3/2009 | Scheppmann | 382/103 |
| 8,055,053 | B2 * | 11/2011 | Kwok et al. | 382/141 |
| 8,195,368 | B1 * | 6/2012 | Leban et al. | 701/50 |
| 2002/0191813 | A1* | 12/2002 | Uchida et al. | 382/100 |
| 2004/0126015 | A1* | 7/2004 | Hadell | 382/181 |
| 2005/0027435 | A1* | 2/2005 | Scheppmann | 701/117 |
| 2008/0048872 | A1* | 2/2008 | Frank | 340/600 |
| 2008/0111693 | A1* | 5/2008 | Johnson et al. | 340/572.1 |
| 2008/0147344 | A1* | 6/2008 | Kwok et al. | 702/83 |
| 2008/0252417 | A1* | 10/2008 | Thomas et al. | 340/10.1 |
| 2009/0067673 | A1* | 3/2009 | Hofmann et al. | 382/103 |
| 2009/0112510 | A1* | 4/2009 | Crane et al. | 702/166 |
| 2010/0089855 | A1* | 4/2010 | Kjolseth | 212/276 |
| 2010/0243594 | A1* | 9/2010 | King et al. | 212/276 |
| 2010/0303285 | A1* | 12/2010 | Iizuka | 382/100 |
| 2011/0017693 | A1* | 1/2011 | Thomas et al. | 212/270 |

* cited by examiner

Model E 96DNS 180-2.5
EN 13852-1 Auxillary Hook Ratings
9 Parts 32mm Boom Suspension; 1 Part 32mm Aux

| Load radius [m] | Boom angle [°] | ONBOARD Rated Load [tonnes] $H_{sig}$ = 0 to 6 | OFFBOARD Rated Load [tonnes] $H_{sig}$ = Significant Wave Height [m] | | | | | | | | | | | |
|---|---|---|---|---|---|---|---|---|---|---|---|---|---|---|
| | | | 0.5 | 1.0 | 1.5 | 2.0 | 2.5 | 3.0 | 3.5 | 4.0 | 4.5 | 5.0 | 5.5 | 6.0 |
| 12.0 | 82.5 | 17.4 | 17.4 | 17.4 | 15.3 | 13.5 | 12.3 | 11.3 | 10.5 | 10.4 | 9.1 | 8.6 | 8.1 | 7.7 |
| 12.5 | 82.0 | 17.4 | 17.4 | 17.4 | 15.3 | 13.5 | 12.3 | 11.3 | 10.5 | 10.4 | 9.1 | 8.6 | 8.1 | 7.7 |
| 15.0 | 79.5 | 17.4 | 17.4 | 17.4 | 15.3 | 13.5 | 12.3 | 11.3 | 10.5 | 10.4 | 9.1 | 8.6 | 8.1 | 7.7 |
| 17.5 | 76.9 | 17.4 | 17.4 | 17.4 | 15.3 | 13.5 | 12.3 | 11.3 | 10.5 | 10.4 | 9.1 | 8.6 | 8.1 | 7.7 |
| 20.0 | 74.4 | 17.4 | 17.4 | 17.4 | 15.3 | 13.5 | 12.3 | 11.3 | 10.5 | 10.4 | 9.1 | 8.6 | 8.1 | 7.7 |
| 22.5 | 71.8 | 17.4 | 17.4 | 17.4 | 15.3 | 13.5 | 12.3 | 11.3 | 10.5 | 10.4 | 9.1 | 8.6 | 8.1 | 7.7 |
| 25.0 | 69.1 | 17.4 | 17.4 | 17.4 | 15.3 | 13.5 | 12.3 | 11.3 | 10.5 | 10.4 | 9.1 | 8.6 | 8.1 | 7.7 |
| 27.5 | 66.4 | 17.4 | 17.4 | 17.4 | 15.3 | 13.5 | 12.3 | 11.3 | 10.5 | 10.4 | 9.1 | 8.6 | 8.1 | 7.7 |
| 30.0 | 63.7 | 17.4 | 17.4 | 17.4 | 15.3 | 13.5 | 12.3 | 11.3 | 10.5 | 10.4 | 9.1 | 8.6 | 8.1 | 7.7 |
| 32.5 | 60.8 | 17.4 | 17.4 | 17.4 | 15.3 | 13.5 | 12.3 | 11.3 | 10.5 | 10.4 | 9.1 | 8.6 | 8.1 | 7.7 |
| 35.0 | 57.9 | 17.4 | 17.4 | 17.4 | 15.3 | 13.5 | 12.3 | 11.3 | 10.5 | 10.4 | 9.1 | 8.6 | 8.1 | 7.7 |
| 37.5 | 54.9 | 17.4 | 17.4 | 17.4 | 15.3 | 13.5 | 12.3 | 11.3 | 10.5 | 10.4 | 9.1 | 8.6 | 8.1 | 7.7 |
| 40.0 | 51.8 | 17.4 | 17.4 | 17.4 | 15.3 | 13.5 | 12.3 | 11.3 | 10.5 | 10.4 | 9.1 | 8.6 | 8.1 | 7.7 |
| 42.5 | 48.5 | 17.4 | 17.4 | 17.4 | 15.3 | 13.5 | 12.3 | 11.3 | 10.5 | 10.4 | 9.1 | 8.6 | 8.1 | 7.7 |
| 45.0 | 45.0 | 17.4 | 17.4 | 17.4 | 15.3 | 13.5 | 12.3 | 11.3 | 10.5 | 10.4 | 9.1 | 8.6 | 8.1 | 7.6 |
| 47.5 | 41.3 | 17.4 | 17.4 | 17.0 | 14.8 | 13.0 | 11.8 | 10.8 | 9.9 | 9.8 | 8.5 | 8.0 | 7.5 | 7.1 |
| 50.0 | 37.2 | 17.4 | 17.4 | 16.0 | 13.8 | 12.2 | 11.0 | 10.1 | 9.3 | 9.2 | 8.0 | 7.5 | 7.1 | 6.7 |
| 52.5 | 32.8 | 17.4 | 17.4 | 15.1 | 13.0 | 11.5 | 10.5 | 9.6 | 8.9 | 8.8 | 7.7 | 7.2 | 6.8 | 6.4 |
| 55.0 | 27.6 | 17.4 | 17.4 | 14.4 | 12.5 | 11.1 | 10.1 | 9.3 | 8.6 | 8.5 | 7.5 | 7.1 | 6.7 | 6.3 |
| 57.5 | 21.3 | 17.4 | 16.9 | 14.1 | 12.2 | 10.9 | 9.9 | 9.1 | 8.4 | 8.3 | 7.3 | 6.8 | 6.4 | 6.1 |
| 59.3 | 15.1 | 17.4 | 16.6 | 7.7 | 6.5 | 5.8 | 5.2 | 4.7 | 0 | 0 | 0 | 0 | 0 | 0 |
| 60.8 | 5.0 | 11.1 | 8.7 | 0 | 0 | 0 | 0 | 0 | 0 | 0 | 0 | 0 | 0 | 0 |
| 60.9 | 0.0 | 11.0 | 0 | 0 | 0 | 0 | 0 | 0 | 0 | 0 | 0 | 0 | 0 | 0 |

FIG 2

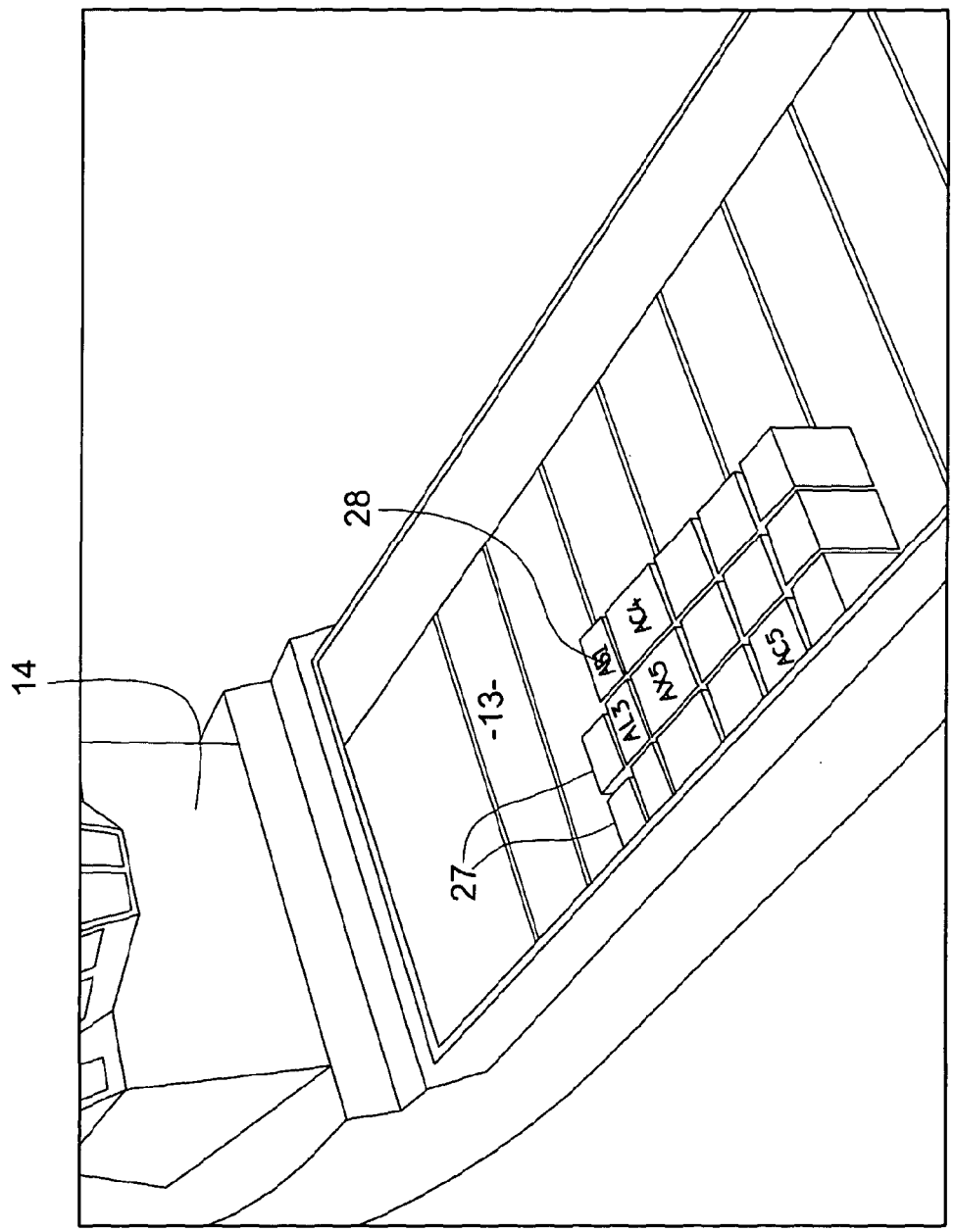

VIDEOMETRIC SYSTEMS AND METHODS FOR OFFSHORE AND OIL-WELL DRILLING

CROSS REFERENCE TO RELATED APPLICATIONS

This application is a 35 U.S.C. §371 national stage application of PCT/GB2011/000665 filed Apr. 28, 2011, which claims the benefit of UK application 1007200.7 filed Apr. 29, 2010, both of which are incorporated herein by reference in their entirety for all purposes.

BACKGROUND

1. Field of the Disclosure

The present disclosure broadly relates to the provision and use of videometry in various operations relating to the field of oil-well drilling, particularly offshore drilling operations. The disclosure is particularly concerned with the operation of cranes to lift cargo from marine vessels.

2. Background of the Technology

Videometry may take various forms but can generally be considered to relate to the use of optical sensing devices to automatically receive and interpret an image of a real scene, to obtain geometrical information, and to control directional information, the location or orientation of a component part, or simply the presence or absence of an object or component in a particular environment.

Crane operations are considered to be one of the most dangerous operations on a modern offshore drilling platform. Every offshore crane is configured and dimensioned to be able to lift a given load at a maximum hoisting speed for a range of lifting radii through which the crane may operate. If the load is too heavy, there are two possible failure scenarios which may occur.

The first of these failures is break down of the crane. This is normally not a significant problem, because the weight of each load is usually known and the operating radius of the crane can be well controlled so as to remain within safe limits for a given load.

The second type of failure is a so-called "re-entry" failure and occurs if the load is not lifted from the supply vessel sufficiently quickly as the vessel heaves, rolls and pitches in the sea below the crane. In such a situation, the load and the vessel may impact with one another after the load has been initially lifted from the vessel and before the load is lifted sufficiently clear of the vessel. This can damage the load and may jeopardise the safety of the vessel, its crew and the structure of the crane itself due to shock loads transmitted through the lifting cable.

SUMMARY

A system for determining a suitable real-time operating regime for a crane arranged to lift cargo from a marine vessel is disclosed herein. In one embodiment, a crane control system for determining a suitable real-time operating regime for a crane arranged to lift cargo from a marine vessel includes: at least one imaging means associated with the crane; processing means; and memory means; wherein the or each said imaging means is arranged to capture images of the vessel when it is located generally below the crane and within the operational range of the crane; said processing means being operable to calculate from said captured images movement parameters characterising the movement of the vessel relative to the crane; and said memory contains performance data representative of the performance characteristics of the crane and cargo data representative of the weight of individual items of said cargo; the processing means further being configured to compare the calculated movement parameters to the performance data and the cargo data and to determine from said comparison a safe operating regime for the crane.

Preferably, said processing means is configured to determine from said comparison safe regions of the vessel from which to lift cargo.

Said movement parameters may include one or more parameters selected from the group comprising: position of the vessel relative to the crane; speed of movement of the vessel (in pitch, roll, and/or heave); and acceleration of the vessel.

Said performance data may comprise a load chart pertaining to the crane.

Conveniently, the or each said imaging means comprises a video camera mounted to the crane.

Preferably, the system further comprises a display operable by said processing means to provide a visual display to an operator of the crane of the or each safe regions of the vessel from which to lift cargo.

Said cargo data may further comprise data representative of the weight and/or size of individual items of said cargo; and said processing means may be operable to identify from said captured images indicia provided on one or more individual items of said cargo and to relate said indicia to said cargo data so as to determine automatically the weight and/or size of the or each said item of cargo.

In another embodiment, a method of operating a crane arranged to lift cargo from a marine vessel, the method comprising the steps of: capturing video images of the vessel when it is located generally below the crane and within the operational range of the crane; processing said images via a processing means to calculate movement parameters characterising the movement of the vessel relative to the crane; wherein performance data representative of the performance characteristics of the crane and cargo data representative of the weight of individual items of said cargo are stored in memory means; the method further comprising the step of comparing the calculated movement parameters to the performance data and the cargo data and determining from said comparison a safe operating regime for the crane.

Preferably, the method further comprises the step of operating said processor so as to determine from said comparison safe regions of the vessel from which to lift cargo.

Optionally, said movement parameters include one or more parameters selected from the group comprising: position of the vessel relative to the crane; speed of movement of the vessel (in pitch, roll, and/or heave); and acceleration of the vessel.

Said performance data may comprise a load chart pertaining to the crane.

The method may also comprise the step of displaying on a display operable by said processing means a visual representation of the or each safe regions of the vessel from which to lift cargo.

Preferably, said cargo data further comprises data representative of the weight and/or size of individual items of said cargo; and the method further comprises the step of identifying from said captured images indicia provided on one or more individual items of said cargo and to relating said indicia to said cargo data so as to determine automatically the weight and/or size of the or each said item of cargo.

BRIEF DESCRIPTION OF THE DRAWINGS

So that the invention may be more readily understood, and so that further features thereof may be appreciated, embodiments of the invention will now be described by way of example with reference to the accompanying drawings in which:

FIG. 2 is an example of a load chart for an offshore crane of the general type shown in FIG. 1;

FIG. 10 shows a region of the cargo deck of a supply vessel carrying a plurality of individually marked cargo containers.

DETAILED DESCRIPTION

Figure 1:
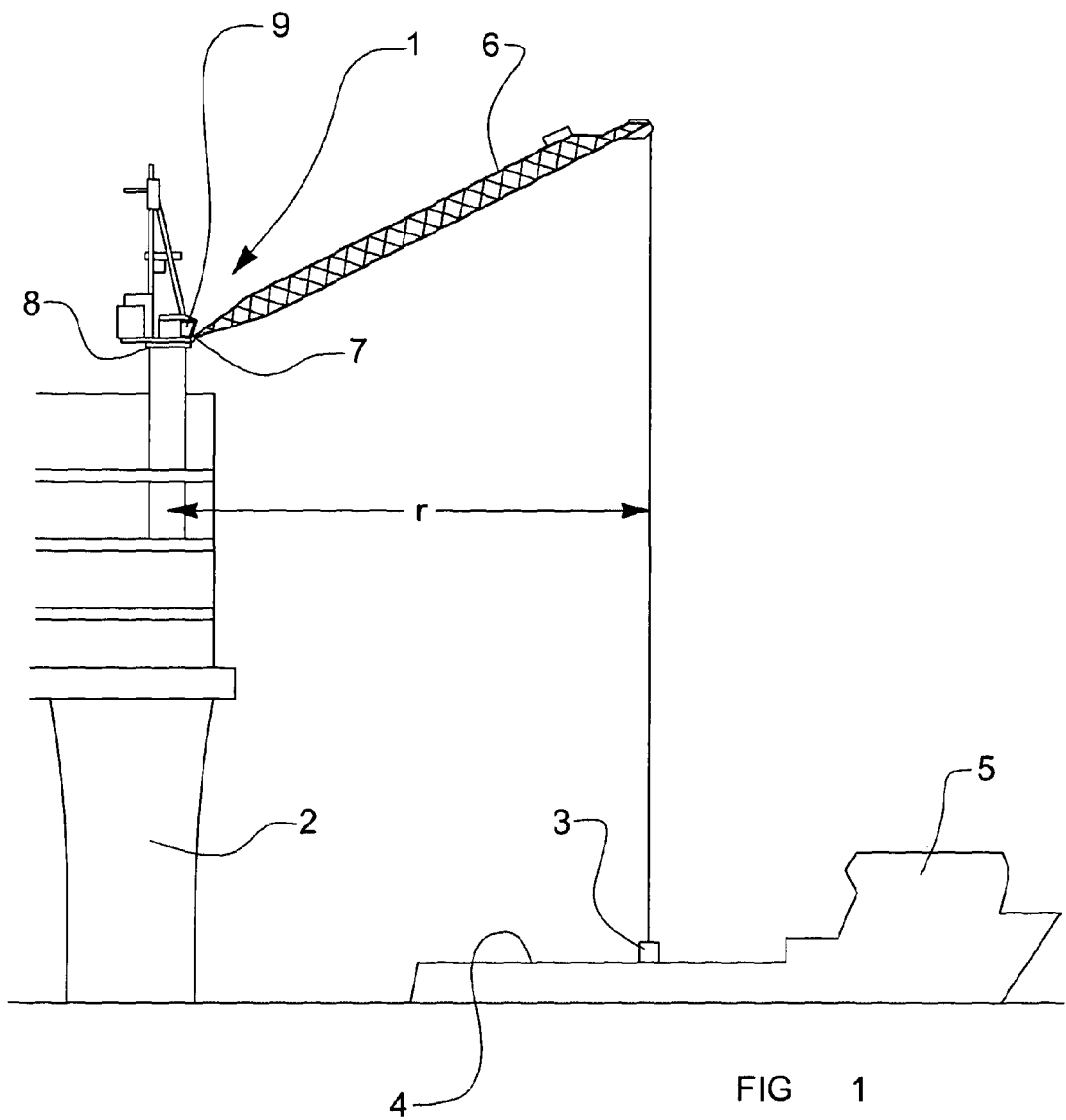
FIG. 1 is a schematic illustration showing a crane on an offshore platform in use to lift cargo from a supply ship.

FIG. 1 is a schematic illustration of a conventional offshore crane 1 mounted on a drilling platform 2 and which is used to lift loads 3 from the cargo deck 4 of surface supply vessel 5. The particular crane 1 illustrated is a lattice boom crane having a boom 6 which is pivotally mounted at its lower end 7 to a slewing platform 8. The slewing platform 8 is mounted to the drilling platform 2 for rotation about a vertical axis and carries an operator's cab 9 from which an operator controls the crane and from where he or she must be able to see the cargo deck 4 of the vessel 5. As will be appreciated, the angle of the boom 6 can be adjusted in order to vary the load radius r. Although a lattice boom crane 1 is illustrated in FIG. 1, and will be used herein to illustrate and describe embodiments of the invention, it is to be appreciated that embodiments of the invention are not intended to be limited to such a particular configuration of crane and could be applied to the operation of any type of offshore crane, noting in this regard that the problems associated herein with conventional offshore crane operations apply to any type of offshore crane, regardless of its particular type.

Most cranes have known performance characteristics and have a predetermined safe speed dependency rating. This means that for heavy loads, the crane operates at a slower lifting speed than it does for lighter loads. The weight of the load to be lifted thus has a direct effect on the lifting speed and is thus a factor in the risk of "re-entry" of the load relative to the vessel.

To avoid re-entry, the allowable lifting capacity of the crane is limited by a load-radius-vessel speed chart. The problem, however, is that the speed at which the vessel moves (principally in heave, but also in roll and pitch) in the sea below the crane is not known. To overcome this, the vessel speed in the crane's load chart is replaced with a significant wave height value which of course is dependant on the sea state at any given time. FIG. 2 illustrates an example of crane load chart of this type. The columns of the chart of most interest are those relating to Load Radius and Significant Wave Height. When these two parameters are known, a crane operator can read off from the chart to find the maximum load that the crane can lift for the given load radius and sea state.

However, the vessel does not behave in a one-to-one relation with the significant wave height. Waves are individual and come from different directions and so create an irregular wave pattern. Also, the vessel moves very differently in a head sea than it does in a side sea. It should also be noted that different regions of the deck of the vessel from which the cargo must be lifted move with different speeds depending on their distance from the vessel's metacentre.

As will therefore be appreciated, the relative speed of an item of cargo such as a container located on the vessel deck is not an easy parameter to estimate.

Conventional crane operations are managed entirely manually. The operator of a crane has visual contact with the vessel below, and estimates the vessel's movements based on judgement and experience, sometimes also combined with some average wave height measurements taken prior to the commencement of lifting. In rough weather there are two outcomes: i) the lifting operation is postponed and the vessel departs without being unloaded, or ii) the lifting operation is carried out, with the risk of accidents. Given the variability and unpredictable nature of the movement of the supply vessel, manual operation of offshore cranes in this manner has been found to be inefficient and sometimes dangerous.

It is therefore an object of the present disclosure to provide an improved crane control system and an improved method of operating a crane in order to address these issues.

Cargo for offshore platforms or other offshore installations is usually shipped in standard freight containers. These containers are usually marked with indicia such as code numbers or the like which are provided on the top surface of the containers so as to be visible to a crane operator in his or her operating cab high above the supply vessel. It is current practice for information relating to the weight and size of each cargo container to be provided in paper format using folders attached to each respective container itself. As will be appreciated, this data is thus not conveniently available to the crane operator and so it is not uncommon for the operator not to know the actual weight and/or size each container prior to lifting it. This adds a further complication and potential inaccuracy to the manual operating procedures currently in practice. Embodiments disclosed herein provide an improved crane control system and an improved method of operating a crane in order to address this issue.

Figure 3:
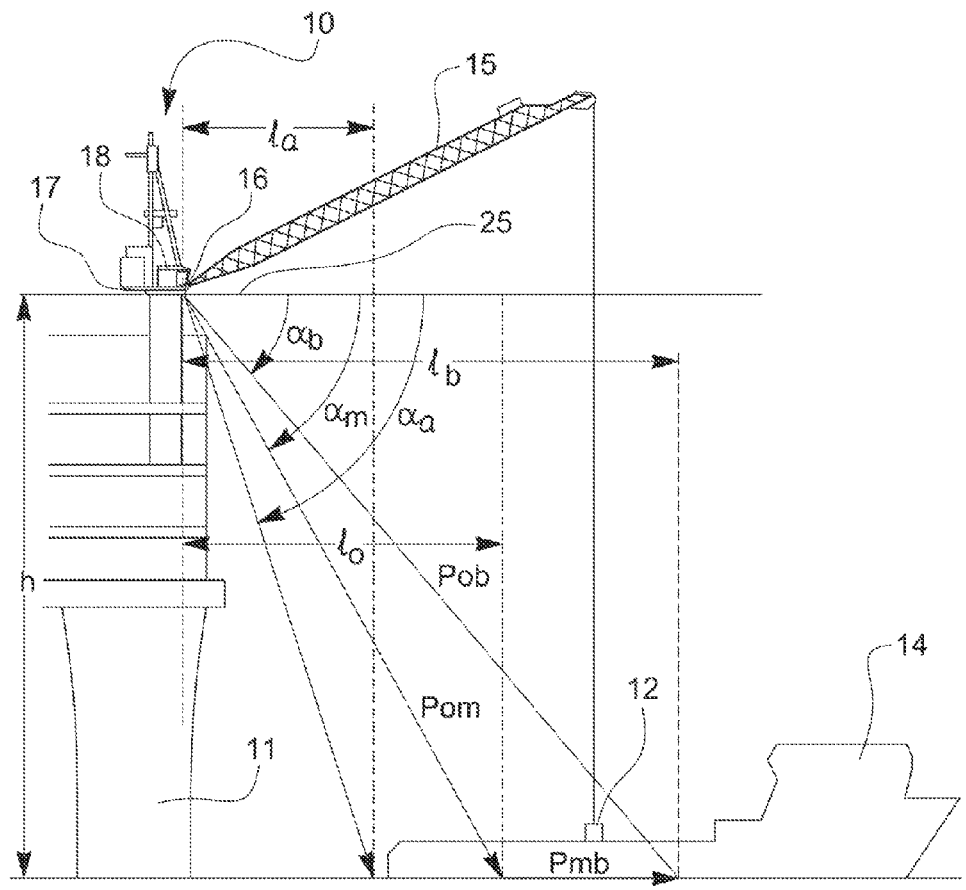
FIG. 3 is a schematic illustration showing a crane provided with a control system in accordance with an embodiment of the present invention.

Turning now to consider FIG. 3 in more detail, there is illustrated an offshore crane 10 mounted on a drilling platform 11 and which is used to lift loads 12 from the cargo deck 13 of surface supply vessel 14. The particular crane 10 illustrated is a lattice boom crane having a boom 15 which is pivotally mounted at its lower end 16 to a slewing platform 17. The slewing platform 17 is mounted to the drilling platform 11 for rotation about a vertical axis and carries an operator's cab 18 from which an operator controls the crane and from where he or she is able to see the cargo deck 13 of the vessel 14 as the vessel is held on station in a loading position relative to the drilling platform 11 as shown. As will be appreciated, the angle of the boom 15 can be adjusted in order to vary the load radius r. Although the particular crane illustrated in FIG. 3 is a derrick type crane, it is to be appreciated that the system and method of the present disclosure, which will be described below, can also be used in conjunction with cranes of other types.

Figure 4:
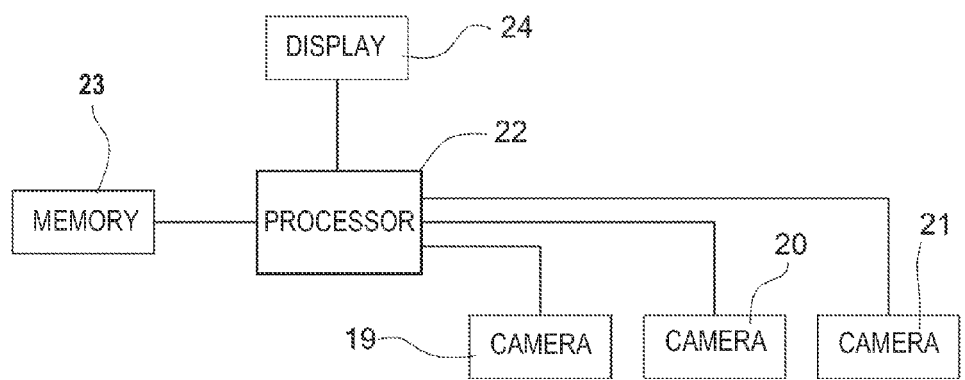
FIG. 4 is a schematic illustration showing components of the control system.

The crane 10 is provided in combination with a control system which is illustrated schematically in FIG. 4 and which comprises a plurality of video cameras or other convenient imaging means 19, 20, 21. The cameras are electrically connected to a processing means 22 which is connected to a memory means 23 (or may in alternative embodiments incorporate a suitable memory itself), and a display means 24 such as a video display unit or the like.

The particular system arrangement illustrated in FIG. 4 will be seen to comprise three discrete video cameras 19, 20, 21, and these are proposed to be mounted to the drilling platform 11 and/or the crane 10 itself in positions such that each camera can be directed generally downwardly so as to capture video images of the supply vessel 14, and most notably the cargo deck 13 of the vessel when the vessel 14 is located generally in the loading position illustrated in FIG. 3.

Figure 5:
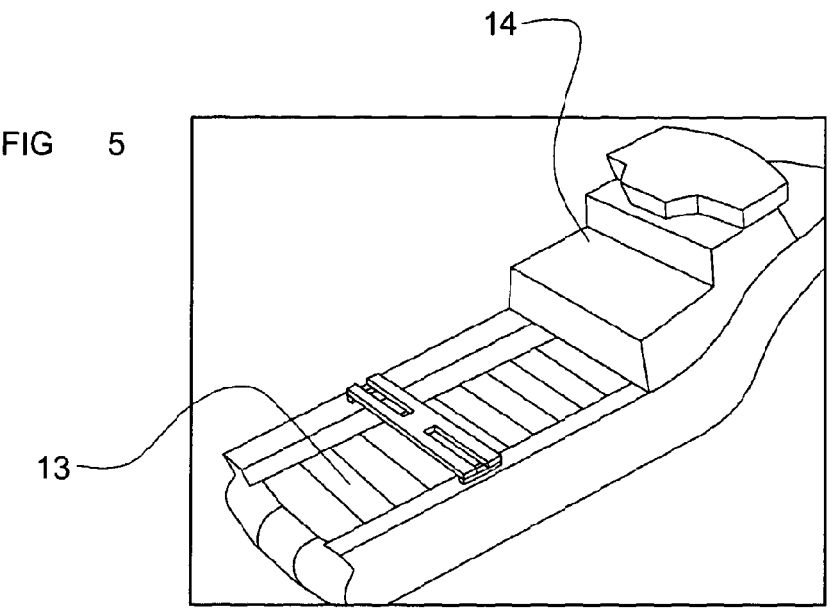
FIG. 5 is a representation of a video image captured by a first video camera of the crane control system.
Figure 6:
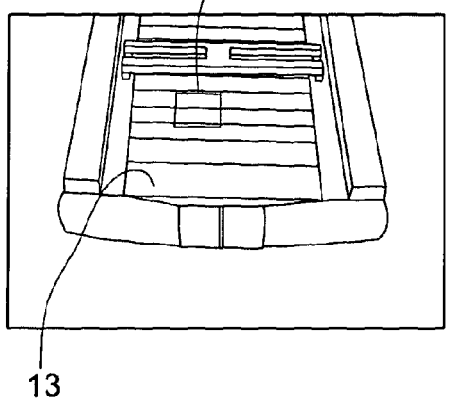
FIG. 6 is a representation of a video image captured by a second video camera of the crane control system.
Figure 7:
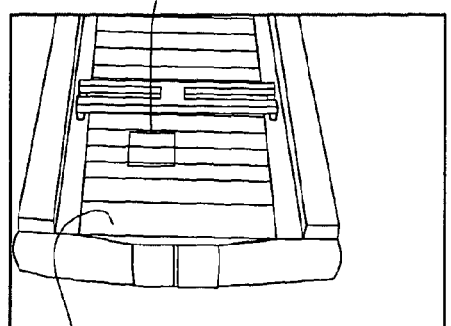
FIG. 7 is a representation of a video image captured by a third video camera of the crane control system.

FIG. 5 is a schematic illustration of a video image captured by the first (optional) video camera 19 which may, for example, be mounted on the drilling platform 11 at a position spaced slightly from the crane 10 itself. Similarly, FIG. 6 shows an image captured by the second camera 20 which it is proposed will be located on the crane 10 itself, at a position conveniently located in order to provide a clear and substantially unrestricted view of the vessel 14. Such a position is illustrated at 25 in FIG. 3 and may, for example, be provided near the operator's cab 18. FIG. 7 shows an image captured by the third camera 21 which it will be noted is taken from a viewpoint spaced only slightly from the position of the second camera 20. It is therefore to be appreciated that the third camera 21 is also proposed to be mounted on the crane 10 itself.

The positions of the second and third cameras 20, 21 in particular are carefully selected to optimise the accuracy of the control system. The maximum achievable accuracy is purely a geometric problem and as such is unrelated to the computer vision aspects of the system. The factors relating to this accuracy are camera separation, overlapping field of view and distance between the cameras 20, 21 and the vessel 14.

The mechanical operation of the particular crane 10 also represents an important factor in the proper siting of the cameras 20, 21. In this regard, it is to be noted that an offshore crane 10 of the type described above will always operate in an area that follows the rotation of the slewing platform 17. Positioning the cameras 20, 21 on the slewing platform 17 will thus allow for a much more targeted field of view because of course the cameras will rotate with the slewing platform but remain in fixed relation to one another during such movement of the slewing platform. There is no need to capture images of areas that are outside the working area of the crane.

Figure 8:
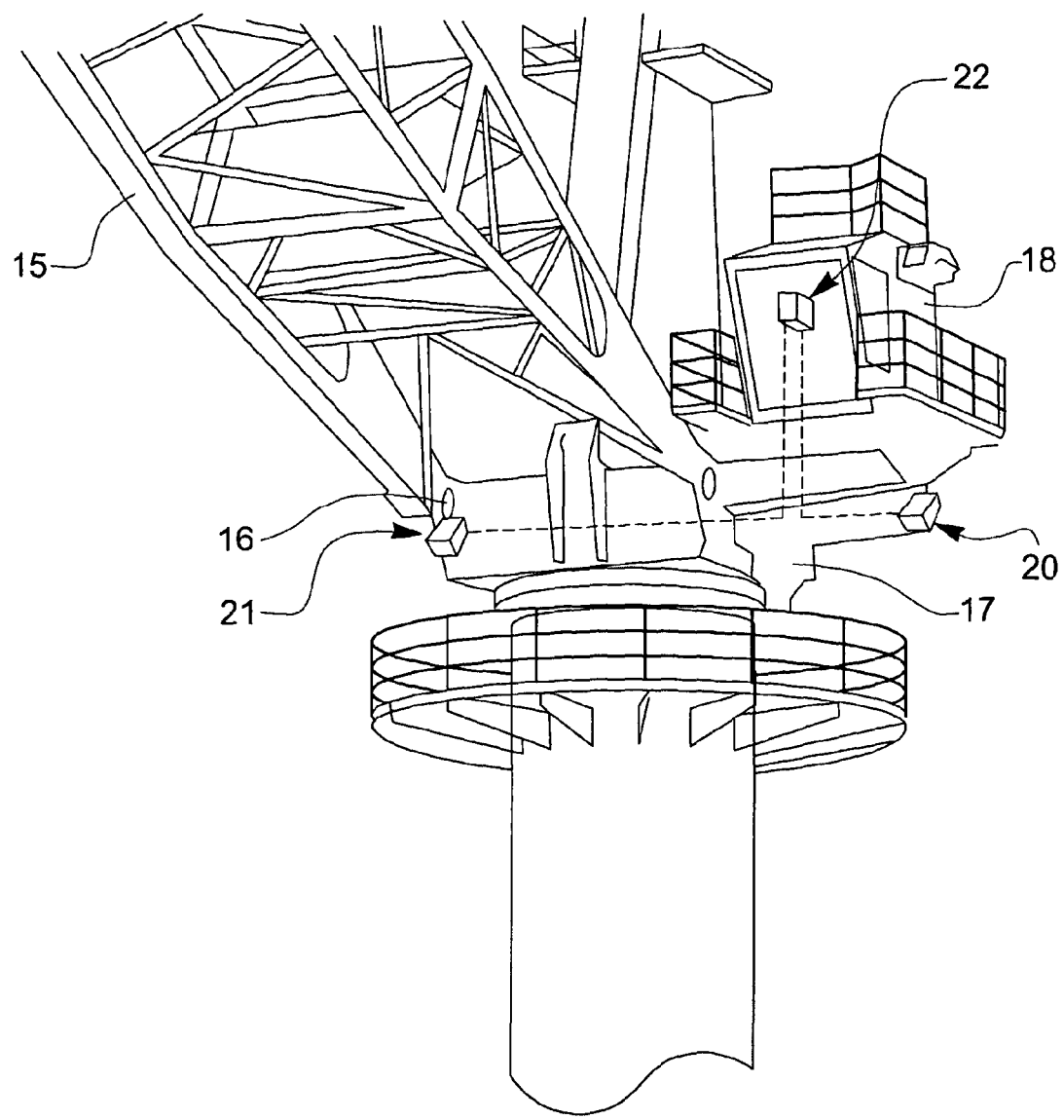
FIG. 8 is a an illustration of part of a crane, showing the positions of two cameras forming part of the control system.

The slewing platform 17 of a typical offshore crane 10 is generally located approximately 50-100 meters above sea level. As indicated above, the crane 10 has three main movements: the slewing platform 17 can rotate; the angle of the boom 15 relative to horizontal can change; and the hook can be lowered and hoisted with a winch. At least two cameras 20, 21 will be mounted on the slewing platform 17 as shown in more detail in FIG. 8, and will therefore move with the platform as it rotates. As will be noted, the cameras 20, 21 are mounted to the slewing platform on opposite sides of the platform, and as such one camera 20 is located on the left-hand side of the platform 17 and the other camera 21 is located on the right-hand side of the platform. FIG. 8 also shows the processing means 22 located in the operators cab 18.

The relative position and view angle between the cameras 20, 21 is fixed at all times in some embodiments. The cameras' position and field of view preferably do not change as the vertical angle of the boom 15 is changed.

The separation between the cameras 20, 21 is a compromise between accuracy and the difficulty of achieving stereo correspondence between the images produced by the cameras. If the images produced by the cameras differ from one another it will be difficult for the processor to identify the same objects in each image. Positioning the cameras 20, 21 on opposite sides of a typical slewing platform has been found to represent a suitable compromise between accuracy and stereo correspondence of the images when processed by the processing means 22 in the manner described below.

The field of view of each camera 20, 21 should capture all the positions at sea level where the crane 10 can, or will usually position its hook during lifting operations. This area will thus encompass the complete deck area 13 of a supply vessel 14 which is only a few meters above the sea level. The fields of view of the two cameras should overlap as much as possible.

It is proposed that the memory means 23 will contain performance data representative of the performance characteristics of the particular crane 10, and also cargo data representative of the weight of individual items of cargo carried by the supply vessel 14. In particular, it is envisaged that the performance data relating to the crane will comprise information similar to that illustrated in the load chart shown in FIG. 2. The cargo data will be entered into the memory means 23 when the appropriate data is known from the cargo load of the vessel 14 to be unloaded by the crane 10.

The processing means 22 is configured and operable to analyse the captured images from the video cameras 19, 20, 21 (which are preferably provided in digital form), and in particular is configured to monitor and analyse the movement of the vessel 14, for example the movement of the vessel in heave, pitch and/or roll, and also to monitor and analyse the position of the vessel 14 relative to the crane 10 and also the acceleration of the vessel (again in heave, pitch and/or roll).

The processor is, more particularly, configured to calculate from the images captured by the video cameras 19, 20, 21, movement parameters which characterise the movement of the vessel 14 relative to the crane 10 and which accurately characterise the actual movement of the vessel in the sea in a real-time manner.

The processor 22 is configured to analyse the captured images from the cameras according to a scheme comprising three principle processing stages: namely an initialisation stage; a tracking stage; and a position computation stage, as will be described in more detail below.

Figure 9:
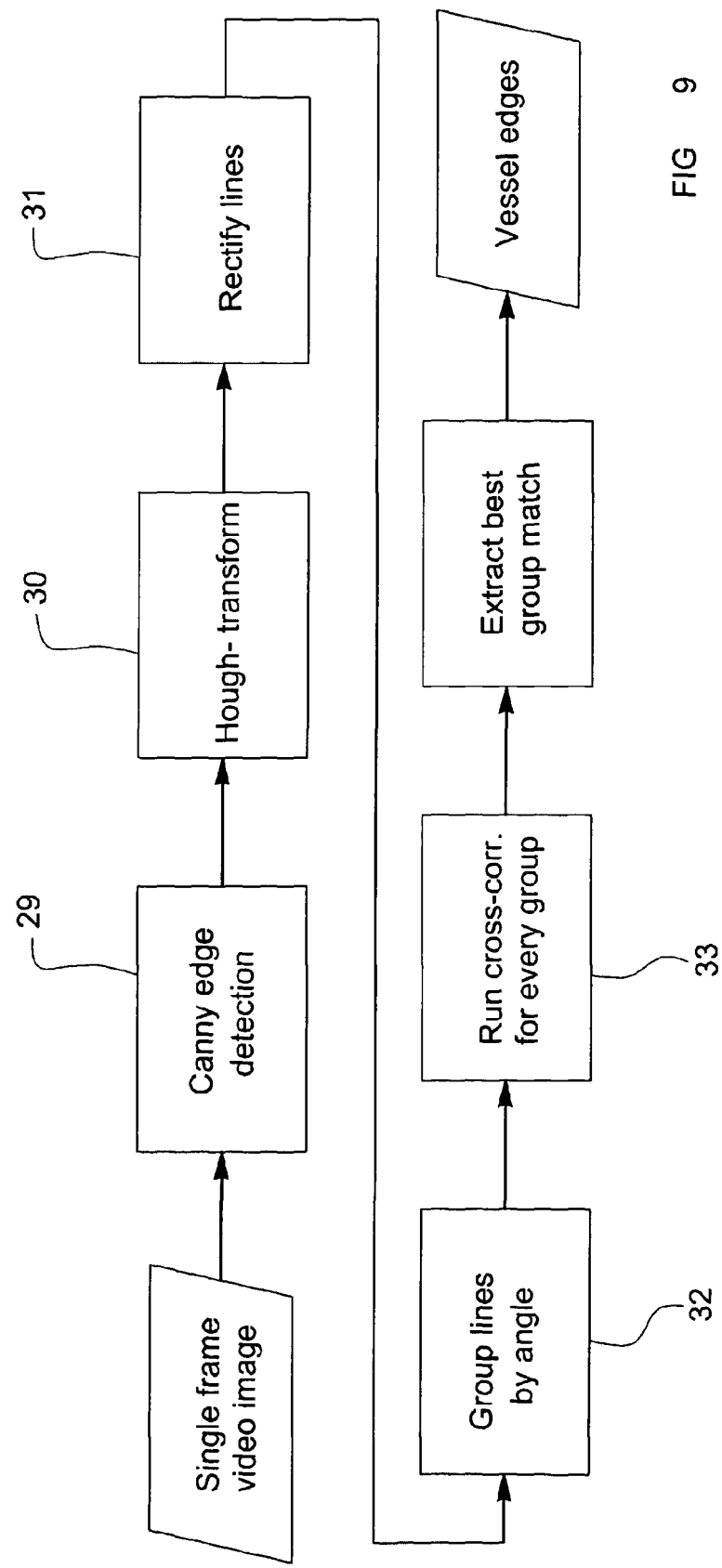
FIG. 9 is a schematic flow diagram representing the computation steps used to locate the vessel in the images from the cameras.

The initialisation stage of the processing scheme is effective to locate and "find" the vessel 14 in the images received by the processor from each camera 19, 20, 21, and is illustrated schematically in FIG. 9. It is proposed to use a line based, edge-detection algorithm to capture the shape of the target vessel 14 in the images. This technique has been found to be particularly effective due to the fact that most offshore supply vessels have a relatively large rectangular cargo deck 13 with parallel sides which are relatively easily identified by image processing.

It is proposed to use a Hough line transform algorithm 30 to extract straight lines from the images captured by the cameras 19, 20, 21. However, before the Hough transform 30 can be applied, the images must first be filtered to make the edges of the vessel 14 become clear. This is preferably done using an edge detection algorithm such as the Canny edge detector algorithm 29.

The Hough line transform algorithm 30 is used to produce an output in the form of a list of image parameters which are considered to represent matched straight lines and which will arise mostly from the geometric properties of the vessel 14 in the images captured by the cameras. However, as will be appreciated the structure of the vessel 14 gives rise to such parameters relating to lines other than those which actually correspond to the sides of the vessel 14. A search algorithm is thus used to select the two parallel lines from those produced by the Hough line transform which represent the best candidates to represent the port and starboard sides of the vessel 14.

As will be appreciated, due to the positioning of the cameras 19, 20, 21 on the platform to the side of the vessel's loading/unloading position as illustrated in FIG. 3, parallel lines at the sea surface will not appear parallel in the video images captured by the cameras 19, 20, 21. This means that it cannot be assumed that the sides of the vessel 14 will appear parallel in the captured images.

By making assumptions about the captured images from the cameras, the lines found by the Hough-transform can be rectified in step 31 in a form which makes parallel vessel edges appear parallel in the video images in most situations. This is possible by determining the position of each camera 19, 20, 21 through calibration.

When all the lines found by the Hough-transform have been rectified in this manner they will all represent lines which are parallel to the sea surface, meaning that that lines which were originally parallel to each other at the sea surface (and as such candidates for the sides of the vessel 14), will appear parallel in the rectified data set. The lines are then grouped together (in step 32) into groups of lines having similar angles relative to a fixed datum (and hence approximately parallel) and a cross-correlation based search technique is then used in step 33 to select the group of lines most closely matching the known width of the vessel 14 and hence representative of the sides of the vessel 14.

The above-described processing steps are effective to identify the vessel 14 in the image from each camera regardless of the fore-to-aft orientation of the vessel in the image frame; providing the vessel is located somewhere in the images captured by each camera then the processor will reliably identify the vessel in the images.

Having identified the sides of the vessel 14 from the images, the processing means then implements the tracking stage of its processing scheme to select and track a plurality of tracking points in each image, the tracking points being distributed in the area located between the lines selected to represent the sides of the vessel and hence on the vessel's cargo deck. In order to avoid the requirement for the system to be programmed with data representative of the specific visual appearance of a vessel 14, it is considered preferable for the tracking scheme not to require any special markers provided on the vessel specifically for the purpose of video tracking. The tracking method is thus configured to use only the video images themselves for tracking. It is proposed to use a known two-dimensional cross-correlation algorithm to track and follow points in the changing images from each camera. This technique allows a large number of discrete tracking points to be followed simultaneously in each image, and is considered advantageous because it does not change the target representation of the tracked object, and so the representation can be acquired directly from the video frames themselves and used for successive matches in later frames.

To establish a good tracking constellation, the tracking points must be chosen wisely. The two most important properties are widespread constellation and stable tracking points. The stability of a video tracking scheme is largely dependent on the feature that is being tracked. Not every point in a video image can easily be tracked. Difficult or impossible points include: evenly coloured areas, straight lines, repetitive pattern and regions of the image contaminated by noise. Easy features to track include: corners and symbols. Selecting features which are easy to track will greatly improve the quality and accuracy of the tracking. It is therefore proposed to select corners in the images for tracking.

A widespread constellation means that the tracking points are spaced significantly from each other. This gives a better measurement of the edges of the vessel and intuitively better defines movement of the rigid object. If the points are close together small errors in the measurement will lead to very large angular errors.

The output from the above-described two-dimensional cross-correlation algorithm for point tracking comprises pixel values from the images. However, it is proposed that in preferred embodiments, sub-pixel accuracy will be achieved by determining the position of the target points in the images beyond the spatial quantification of the image (the image pixels). This is made possible by looking at grey levels in the images, for example via interpolation which is a technique known in the art for achieving sub-pixel accuracy.

The position computation stage of the processing scheme takes care of transforming multiple pixel positions from the images into the actual and orientation of the supply vessel 14.

Before any correct measurements can be done based on the pixel positions, camera calibration is performed in some embodiments. This has to be done so that the position (separation) and angle/orientation difference between the cameras 19, 20, 21 can be determined. Multiple images of the supply vessel 14 may be taken with each camera (i.e. at least two cameras), preferably in high seas so that the vessel 14 will be captured in various orientations. Additionally a calibration rig comprising a rectangle on the deck 13 with known distances in some preferable unit (e.g. 1 meter) may be used in the calibration. It is important to note that the calibration is a one-time procedure as long as the cameras remain fixed relative to each other. All the subsequent vessels 14 that visit the drilling platform 2 to be services by the crane system will not need to undergo the calibration procedure.

When camera calibration is performed the relation between a real-world 3-D point and the corresponding point in the camera image is known for each camera 19, 20, 21. With two or more cameras this relation can then be reversed so that by having the image point on each camera (which originates from the same real-world point of course) the processor can compute the real-world point. The outputted 3-D position will be in the distance unit that was used in the calibration (preferably meters).

By having three or more 3-D points which are attached onto the same physical rigid object, its position and orientation can be computed. The computation of the translation and orientation of a rigid body is often referred to in the art as "3-D rotation fitting".

The processing means is also configured then to compare the calculated movement parameters derived via the processing stages described above to the crane performance data and the cargo data held in the memory 23 and to determine from that comparison a safe operating regime for the crane. More particularly, it is to be appreciated that the system disclosed herein is intended to automatically monitor and analyse the actual movement of the vessel 14 in the sea below the crane and provide a visual output, on the display 24, in order to assist the operator of the crane in the safe and efficient operation of the crane.

Having regard to FIGS. 6 and 7, it will be seen that these figures show the images captured by the second and third cameras 20, 21 together with an overlaid graphical illustration 26 which, when displayed on the display unit 24, presents the operator of the crane with an illustration of the cargo deck 13 divided up into a series of discrete sectors. It is proposed that the processor 22 will be operable to highlight on the display, for example by highlighting one or more sectors of the graphical overlay 26, the regions of the cargo deck 13 from which it is safe for the operator to lift cargo for the determined motion of the vessel in the seaway.

The above-mentioned crane control system and method is believed to offer significant benefits over the present manual systems currently in use. For example, the automated system and method disclosed herein will offer significantly improved safety, will reduce the likelihood of damage to the cargo being lifted from the vessel and also damage to the vessel itself. It is also anticipated that the system and method of disclosed herein will reduce the number of postponed loading operations due to unpredictable wave patterns and will generally improve the utilisation of any given crane.

Turning now to consider FIG. 10, there is illustrated in perspective view the cargo deck 13 of a typical offshore supply vessel 14. In particular, it will be noted that the cargo deck 13 is illustrated carrying a plurality of discrete cargo containers 27. Each cargo container is provided with a discrete identifying code 28 (for example in alphanumeric form), the code 28 being marked on the uppermost surface of the container so as to be clearly visible from the operator's cab of the crane 10. This sort of cargo marking is generally conventional as already explained in the introductory part of this patent application.

It is proposed that in certain embodiments of the present invention, the processing means 22 will be configured and operable in order to read and identify from the images captured by the video cameras 19, 20, 21, the individual indicia or markings 28 provided on each respective cargo container 27. For example, it is envisaged that the processing means 22 will be configured to operate in the manner of an optical character reader. The control system disclosed herein may thus be configured in order to automatically identify and read the identifying codes of each cargo container 27 located on the cargo deck 13 of the vessel, and then to relate those markings to the cargo data held within the memory 23 so as to determine automatically the weight and/or size of each item of cargo.

It is also proposed that the processor 22 could be operable to identify and track individual items of cargo or containers 27 on the deck 13 of the vessel, via a procedure generally in accordance with that described above, noting in this regard that each container 27 will generally have a plurality of corners which are conveniently identifiable for tracking as proposed above. The processor 22 may be configured to compare calculated movement parameters pertaining to each individual item of cargo 27 to the crane performance data and the cargo data held in the memory 23 and to determine from that comparison a safe operating regime for the crane. For example, this could involve automatically positioning the free end of the crane's boom 15 vertically above the centre of the cargo 27 prior to lifting. Alternatively, the system could be configured to present the crane operator with graphical data on the cab display 24 effective to assist the operator in positioning the free end of the crane's boom 15 above the cargo 27 in this manner. Either of these possibilities will improve the likelihood of the cargo being lifted from the deck substantially vertically, particularly when account is also taken of the movement of the deck itself, thereby reducing the likelihood of the cargo moving horizontally as it is lifted from the deck and hence striking other items of cargo or parts of the vessel's structure.

It is envisaged that embodiments of the system disclosed herein could also be configured to automatically identify and monitor the movement of areas of empty deck space on the vessel as likely targets for lowering cargo back to the deck or for dropping the hook of the crane for loading operatives to handle.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising embodiments of the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. It is intended that the following claims be interpreted to encompass all such variations and modifications.

What is claimed is:

1. A crane control system for determining a suitable real-time operating regime for a crane arranged to lift cargo from a marine vessel, the system comprising:
   an imaging means associated with the crane, wherein said imaging means is arranged to capture images of the vessel when it is located generally below the crane and within the operational range of the crane;
   processing means operable to calculate from said captured images movement parameters characterising the movement of the vessel relative to the crane; and
   memory means, wherein said memory contains performance data representative of the performance characteristics of the crane and cargo data representative of the weight of individual items of said cargo, wherein said performance data comprises a relationship between a maximum load of the crane and a sea state;
   wherein the processing means is further configured to:
      compare the calculated movement parameters to the performance data and the cargo data and to determine from said comparison a safe operating regime for the crane;
      provide a display of a cargo deck of the vessel comprising a graphical overlay that divides the cargo deck into sectors;
      identify, based on the determined safe operating regime, one of the sectors from which it is safe to lift cargo; and
      highlight, on the display, the one of the sectors from which it is safe to lift cargo.

2. The system of claim 1, wherein said processing means is configured to determine from said comparison safe regions of the vessel from which to lift cargo.

3. The system of claim 1, wherein said movement parameters comprise one or more of: position of the vessel relative to the crane; speed of movement of the vessel (in one or more of: pitch, roll, and heave); and acceleration of the vessel.

4. The system of claim 1, wherein said performance data comprises a load chart pertaining to the crane.

5. The system of claim 1, wherein said imaging means is provided in the form of a video camera mounted to the crane.

6. The system of claim 1 further comprising a display operable by said processing means to provide a visual display to an operator of the crane of a safe region of the vessel from which to lift cargo.

7. The system of claim 1, wherein said cargo data further comprises data representative of the weight and/or size of individual items of said cargo; and said processing means is operable to identify from said captured images indicia provided on one or more individual items of said cargo and to relate said indicia to said cargo data so as to determine automatically the weight, size, or weight and size of each of said items of said cargo.

8. A method of operating a crane arranged to lift cargo from a marine vessel, the method comprising:
capturing video images of the vessel when it is located generally below the crane and within the operational range of the crane;
processing said images, via a processing means, to calculate movement parameters characterising the movement of the vessel relative to the crane,
comparing, via the processing means, the calculated movement parameters to performance data representative of the performance characteristics of the crane and cargo data representative of the weight of individual items of said cargo, wherein said performance data comprises a relationship between a maximum load of the crane and a sea state;
determining from said comparison a safe operating regime for the crane;
providing a display of a cargo deck of the vessel comprising a graphical overlay that divides the cargo deck into sectors;
identifying, based on the determined safe operating regime, one of the sectors from which it is safe to lift cargo; and
highlighting, on the display, the one of the sectors from which it is safe to lift cargo.

9. The method of claim 8, further comprising determining from said comparison safe regions of the vessel from which to lift cargo.

10. The method of claim 8 wherein said movement parameters include one or more of: position of the vessel relative to the crane; speed of movement of the vessel (in one or more of: pitch, roll, and heave); and acceleration of the vessel.

11. The method of claim 8, wherein said performance data comprises a load chart pertaining to the crane.

12. The method of claim 8 further comprising displaying on a display operable by said processing means a visual representation of a safe region of the vessel from which to lift cargo.

13. The method of claim 8, wherein said cargo data further comprises data representative of the weight, size, or weight and size of individual items of said cargo; and the method further comprises:
identifying from said captured images indicia provided on one or more individual items of said cargo; and
relating said indicia to said cargo data so as to determine automatically the weight and/or size of each of said items of said cargo.

14. An apparatus, comprising:
a plurality of cameras mounted on a crane and disposed to capture images of a deck of a marine vessel below the crane; and
a processor coupled to the cameras, the processor configured to:
characterize movement of the vessel relative to the crane based on the captured images, the apparatus further comprising:
storage coupled to the processor, the storage containing performance data representative of the performance characteristics of the crane and cargo data representative of the weight of individual items of the cargo, wherein said performance data comprises a relationship between a maximum load of the crane and a sea state; and
a display;
wherein the processor is configured to:
provide an image of the deck on the display, the image comprising a graphical overlay that divides the deck into sectors;
identify, by comparing the characterized movement of the vessel to the performance data and the cargo data, one of the sectors relative to which cargo movement via the crane is deemed safe; and
highlight, on the display, the one of the sectors.

15. The apparatus of claim 14, wherein the cameras are vertically fixed, and mounted for horizontal rotation with the crane.

16. The apparatus of claim 14, further comprising an additional camera mounted to a platform on which the crane is mounted and coupled to the processor, the additional camera disposed to capture images of a deck of a marine vessel below the crane.

17. The apparatus of claim 14, further comprising a display; wherein the processor is configured to:
provide an image of the deck on the display; and
highlight a portion of the image corresponding to the region of the deck relative to which cargo movement via the crane is deemed safe.

18. The apparatus of claim 14, wherein the processor is configured to:
identify and track, based on the captured images, an item of cargo disposed on the deck;
determine at least one of size and weight of the item of cargo; and
identify, based on the determined size and weight, the region of the deck relative to which cargo movement via the crane is deemed safe.

19. The apparatus of claim 14, wherein the processor is configured to automatically position a free end of a boom of the crane above the region of the deck relative to which cargo movement via the crane is deemed safe.

* * * * *